No. 710,341. Patented Sept. 30, 1902.
W. H. RYMER.
BUCKET OR MANGER.
(Application filed Aug. 15, 1900.)
(No Model.)
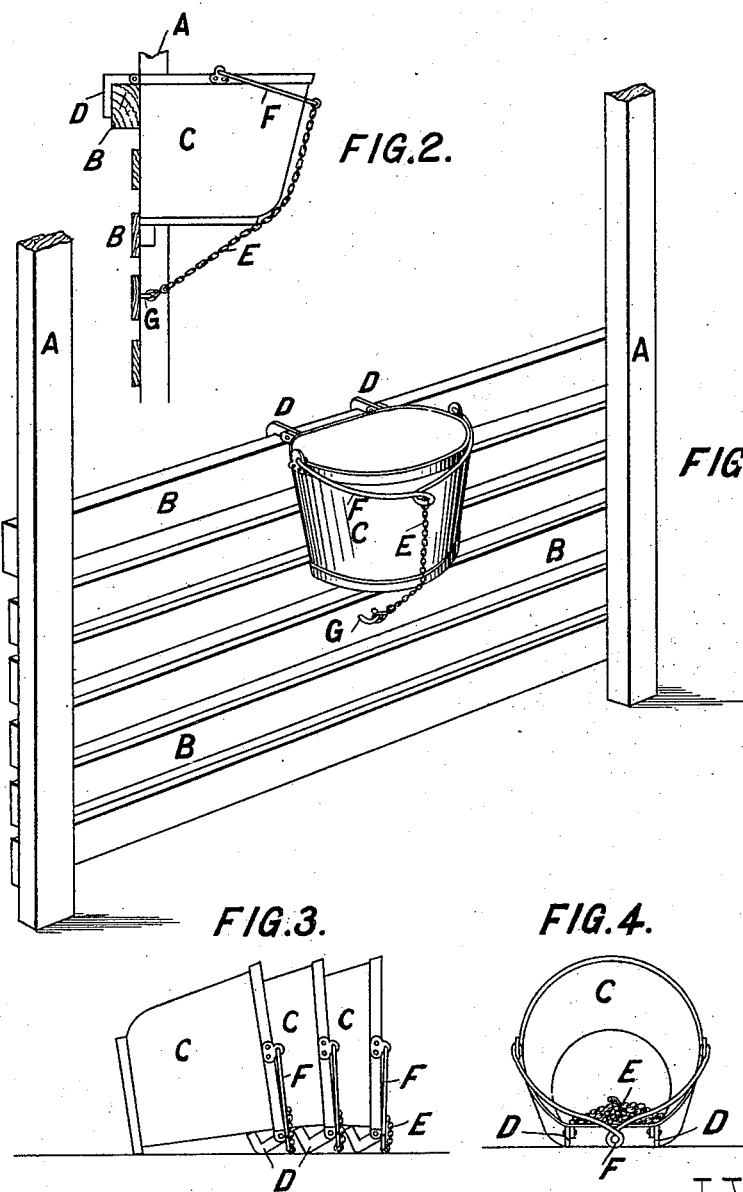

UNITED STATES PATENT OFFICE.

WILLIAM H. RYMER, OF LIVERPOOL, ENGLAND.

BUCKET OR MANGER.

SPECIFICATION forming part of Letters Patent No. 710,341, dated September 30, 1902.

Application filed August 15, 1900. Serial No. 26,985. (No model.)

*To all whom it may concern:*

Be it known that I, WILLIAM HENRY RYMER, a subject of the Queen of Great Britain, residing in Liverpool, in the county of Lancaster, England, (whose post-office address is 11 Rumford Place, Liverpool, aforesaid,) have invented a certain new and Improved Bucket or Manger, (for which application for a patent has been made in Great Britain, No. 2,369, dated February 6, 1900,) of which the following is a specification.

This invention has for its object an appliance which can be used for the double purpose of a water-bucket and of a manger for feeding horses and cattle on board ship or elsewhere, as may be required.

The invention will be understood from the following description, reference being had to the accompanying drawings, in which—

Figure 1 shows the apparatus fitted up for use for feeding horses or cattle on board ship; Fig. 2, a vertical section through the breast-boards, showing the apparatus in side elevation; Fig. 3, a side view of the apparatus nested together when not required for use; Fig. 4, a front view thereof.

In the figures, A represents the stanchions of a cattle-stall, B the breast-boards thereof, and C the feeding trough or bucket. This appliance is by preference flattened at back, so as to rest firm against the breast-boards B, and it is provided with hinged hooks D, secured to the outside of the bucket, so that the vessel will lie flush against the stall, and which hook over the top breast-board B, and so hold the bucket in place.

F is the handle of the feeding trough or bucket, and E a chain coupled thereto at one end. At the other end it is provided with a snap-hook, which can be fastened to the fixed eye G, and so hold the bucket firmly against the breast-boards, so that it cannot accidentally upset.

In use, therefore, the appliance is hooked onto the breast-board and held down in position by means of the chain E, the handle being prevented from rising by the said chain E. In this position the appliance if supplied with the feeding stuff acts as a manger for the animal to feed from. When the appliance as a manger is finished with, it can be unhooked from the top breast-board B and the chain E unfastened from the eye G. This releases the handle, and the vessel is then easily portable and can be carried about and used as an ordinary water-bucket. The bucket in this way is sure to be kept clean, because by being filled with water occasionally any sour food left in gets cleaned out and insures the horse having sweet food. When the apparatuses are not required for use, they can be nested together, as shown in Figs. 3 and 4, so as to occupy a very small space, and in this way they can be stowed away into about half the amount of room that ordinary mangers would take. This advantage, combined with the advantage of being able to use the appliance for the double purpose of a water-bucket and a feeding-trough, makes it a superior article to the ordinary manger, particularly on shipboard.

I declare that what I claim is—

1. A combined bucket and manger, comprising a vessel provided with a swinging bail, a hook secured to the upper edge of the bucket between the bail-pivots to engage a bar or support, and a flexible connection or chain secured to the middle of the bail and of a length to extend from the bail, when the latter is folded, downwardly under the vessel and provided at its free end with means to fasten or secure it to a lower fixed support and prevent the vessel from rising or tilting; substantially as described.

2. A combined bucket and manger, comprising a vessel provided with a swinging bail and hooks projecting outwardly from the upper edge of the vessel between the bail-pivots to hook over a suitable support, said hooks being pivoted to swing downwardly with their free ends against the side of the bucket in nesting the latter, and a flexible connection or chain secured to the middle of the bail, and of a length to extend downwardly and inwardly under the vessel, and provided at its free end with means for connecting it to a lower fixed support; substantially as described.

In witness whereof I have hereunto signed my name, this 27th day of April, 1900, in the presence of two subscribing witnesses.

WILLIAM H. RYMER.

Witnesses:
 G. C. DYMOND,
 W. H. BEESTON.